(12) United States Patent
Yu et al.

(10) Patent No.: US 9,889,585 B2
(45) Date of Patent: Feb. 13, 2018

(54) GLASS ENCAPSULATION STRUCTURE AND INJECTION MOLDING DEVICE

(71) Applicants: Zhizhao Yu, Shanghai (CN); Pingchun Sheng, Shanghai (CN)

(72) Inventors: Zhizhao Yu, Shanghai (CN); Pingchun Sheng, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/305,013

(22) PCT Filed: Jul. 1, 2015

(86) PCT No.: PCT/CN2015/083020
§ 371 (c)(1),
(2) Date: Oct. 18, 2016

(87) PCT Pub. No.: WO2016/000612
PCT Pub. Date: Jan. 7, 2016

(65) Prior Publication Data
US 2017/0165883 A1    Jun. 15, 2017

(30) Foreign Application Priority Data

Jul. 4, 2014 (CN) .......................... 2014 1 0318143

(51) Int. Cl.
*B29C 45/14* (2006.01)
*B60J 10/70* (2016.01)
(Continued)

(52) U.S. Cl.
CPC .. *B29C 45/14065* (2013.01); *B29C 45/14778* (2013.01); *B60J 10/70* (2016.02); *B29K 2709/08* (2013.01); *B29L 2031/778* (2013.01)

(58) Field of Classification Search
None
See application file for complete search history.

(56) References Cited

U.S. PATENT DOCUMENTS 4,662,113 A * 5/1987 Weaver ............. B29C 45/14377
264/252
5,464,575 A * 11/1995 Jaffiol ............... B29C 45/14377
264/252
(Continued)

FOREIGN PATENT DOCUMENTS

CN    202241788 U    5/2012
CN    103029263 A    4/2013
(Continued)

OTHER PUBLICATIONS

Written Opinion of the International Searching Authority as issued in International Patent Application No. PCT/CN2015/083020, dated Sep. 23, 2015.
(Continued)

*Primary Examiner* — Christina Johnson
*Assistant Examiner* — Mohammad M Ameen
(74) *Attorney, Agent, or Firm* — Pillsbury Winthrop Shaw Pittman LLP

(57) ABSTRACT

A glass encapsulation structure and an injection molding device are provided. The encapsulation structure includes: a guide piece; and an encapsulation component, wherein the guide piece is fixed to a side surface of a glass through the encapsulation component, wherein the guide piece includes a strip part, a bump and a positioning hole, wherein the strip part has a first surface, and a second surface opposite to the first surface and facing an interior of a vehicle body when the guide piece is mounted onto the vehicle body, the bump is located on and perpendicular to the first surface, the positioning hole is formed in the bump, an axis of the positioning hole is perpendicular to the side surface of the glass, and the positioning hole matches a positioning pin in an injection molding device in an injection molding process. A yield of encapsulation structures may be improved.

8 Claims, 3 Drawing Sheets

(51) Int. Cl.
*B29L 31/00* (2006.01)
*B29K 709/08* (2006.01)

(56) References Cited

U.S. PATENT DOCUMENTS

| | | | | |
|---|---|---|---|---|
| 5,566,840 A | * | 10/1996 | Waldner | G03F 9/00 211/41.17 |
| 6,336,276 B1 | * | 1/2002 | Krajec | B23Q 3/18 269/305 |
| 6,474,976 B1 | * | 11/2002 | Oami | B29C 33/18 425/503 |
| 2015/0224677 A1 | | 8/2015 | Sheng | |

FOREIGN PATENT DOCUMENTS

| | | |
|---|---|---|
| CN | 202895600 U | 4/2013 |
| CN | 203157019 U | 8/2013 |
| CN | 203681229 U | 7/2014 |
| CN | 204172665 U | 2/2015 |
| EP | 0 468 713 A1 | 1/1992 |
| WO | WO 2014/086303 A1 | 6/2014 |

OTHER PUBLICATIONS

International Search Report and the Written Opinion of the International Searching Authority as issued in International Patent Application No. PCT/CN2015/083020, dated Sep. 24, 2015.

\* cited by examiner

GLASS ENCAPSULATION STRUCTURE AND INJECTION MOLDING DEVICE

CROSS-REFERENCE TO RELATED APPLICATIONS

The present application is the national phase of International Application No. PCT/CN2015/083020, filed on Jul. 1, 2015, which claims priority to Chinese patent application No. 201410318143.7, filed on Jul. 4, 2014, and entitled "GLASS ENCAPSULATION STRUCTURE AND INJECTION MOLDING DEVICE", and the entire disclosure of which is incorporated herein by reference.

TECHNICAL FIELD

The present disclosure generally relates to vehicle glass technology, and more particularly, to a glass encapsulation structure and an injection molding device.

BACKGROUND

Vehicle glass, such as a side window, a front window and a rear window, can provide a clear vision for drivers, together with sealing and protection functions.

Chinese patent publication No. CN202241788U discloses a vehicle side window. FIG. 1 schematically illustrates a diagram of the side window. Referring to FIG. 1, the side window includes: a triangular window 1, an encapsulation 2 around the triangular window 1, and a black ceramic coating 3, where the black ceramic coating 3 is formed on edge surfaces of the triangular window 1, and the encapsulation 2 is attached on the black ceramic coating 3 by an injection molding process.

The encapsulation may improve the sealing of a vehicle glass and further extend a service life of the vehicle glass. In existing techniques, to reduce the space between a quarter window and a door window, when a glass encapsulation is formed using an injection molding process, a part of a guide piece is pre-injection molded in the glass encapsulation, to fix the guide piece with the quarter window.

However, existing encapsulation structures in a fixed connection with guide pieces are prone to have defects, which may increase a defect rate of the encapsulation structures. Referring to FIG. 2, an existing encapsulation structure 12 does not cover a guide piece 11 completely, thus, a portion of the guide piece 11 is exposed. As a result, a yield of encapsulation structures is reduced.

SUMMARY

A glass encapsulation structure and an injection molding device are required, to improve a yield of encapsulation structures.

In one aspect, a glass encapsulation structure is provided. The glass encapsulation structure includes: a guide piece; and an encapsulation component, wherein the guide piece is fixed to a side surface of a glass through the encapsulation component, wherein the guide piece includes a strip part, a plurality of bumps and at least one positioning hole, and wherein the strip part has a first surface, and a second surface which is opposite to the first surface and faces an interior of a vehicle body when the guide piece is mounted onto the vehicle body, the plurality of bumps are located on the first surface and perpendicular to the first surface, the at least one positioning hole is formed in at least one of the bumps, an axis of the at least one positioning hole is perpendicular to the side surface of the glass, and the at least one positioning hole is adapted for matching at least one positioning pin in an injection molding device in an injection molding process, such that a position relationship between the guide piece and the glass retains unchanged in the injection molding process.

A basic idea is that a fixing function of the positioning pin makes the guide piece resistant to deformation and displacement during injection molding. The encapsulation component may cover the guide piece in an expected manner where the shape and position of the encapsulated component are predetermined. In this way, the possibility of the guide piece being exposed may be lowered, and thus a yield of encapsulation structures may be improved.

In another aspect, an injection molding device for forming an encapsulation component is provided, wherein the encapsulation component fixes a side surface of a glass with a guide piece, and the guide piece includes a strip part, a plurality of bumps and at least one positioning hole, wherein the strip part has a first surface, and a second surface which is opposite to the first surface and faces an interior of a vehicle body when the guide piece is mounted onto the vehicle body, the plurality of bumps are located on the first surface and perpendicular to the first surface, the at least one positioning hole is formed in at least one of the bumps, an axis of the at least one positioning hole is perpendicular to the side surface of the glass, and the injection molding device includes at least one positioning pin which is adapted for matching the at least one positioning hole in an injection molding process, such that a position relationship between the guide piece and the glass retains unchanged in the injection molding process.

A basic idea is that the position relationship between the guide piece and the glass retains unchanged as the positioning hole matches the positioning pin. The guide piece is resistant to deformation and displacement in the injection molding process, and the encapsulation component may cover the guide piece in an expected manner where the shape and position of the encapsulated component are predetermined. In this way, the possibility of the guide piece being exposed may be lowered, and thus a yield of encapsulation structures may be improved.

DETAILED DESCRIPTION

Guide pieces in existing encapsulation structures are easily exposed, which may reduce a yield of the encapsulation structures. The exposure of the guide pieces may be caused by the following reason. During an injection molding process, an injection material becomes a molten plastic under a high temperature and a high pressure. A plastic guide piece is impacted by the molten plastic and thus is easily deformed. The deformed guide piece can not be covered by an encapsulation completely. As a result, a portion of the deformed guide piece is exposed.

Figure 1:
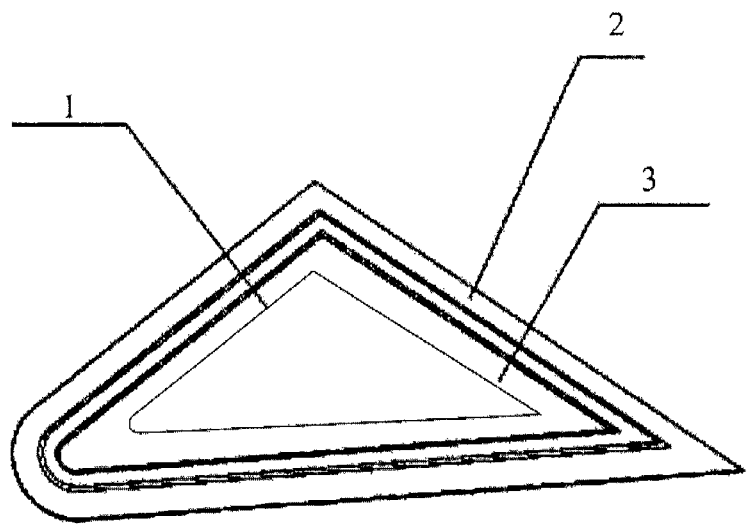
FIG. 1 schematically illustrates a diagram of a side window in existing techniques.
Figure 2:
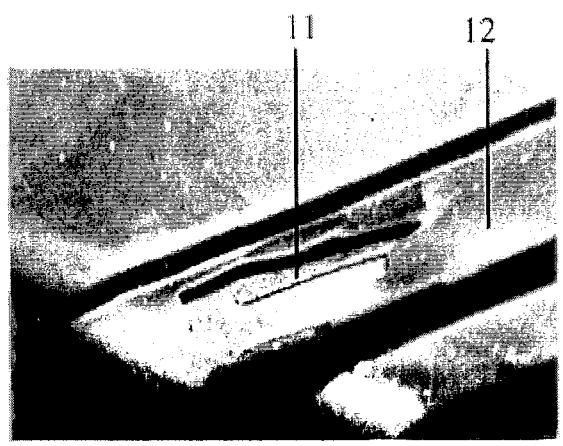
FIG. 2 schematically illustrates a diagram of an encapsulation structure having defects in existing techniques.
Figure 3:
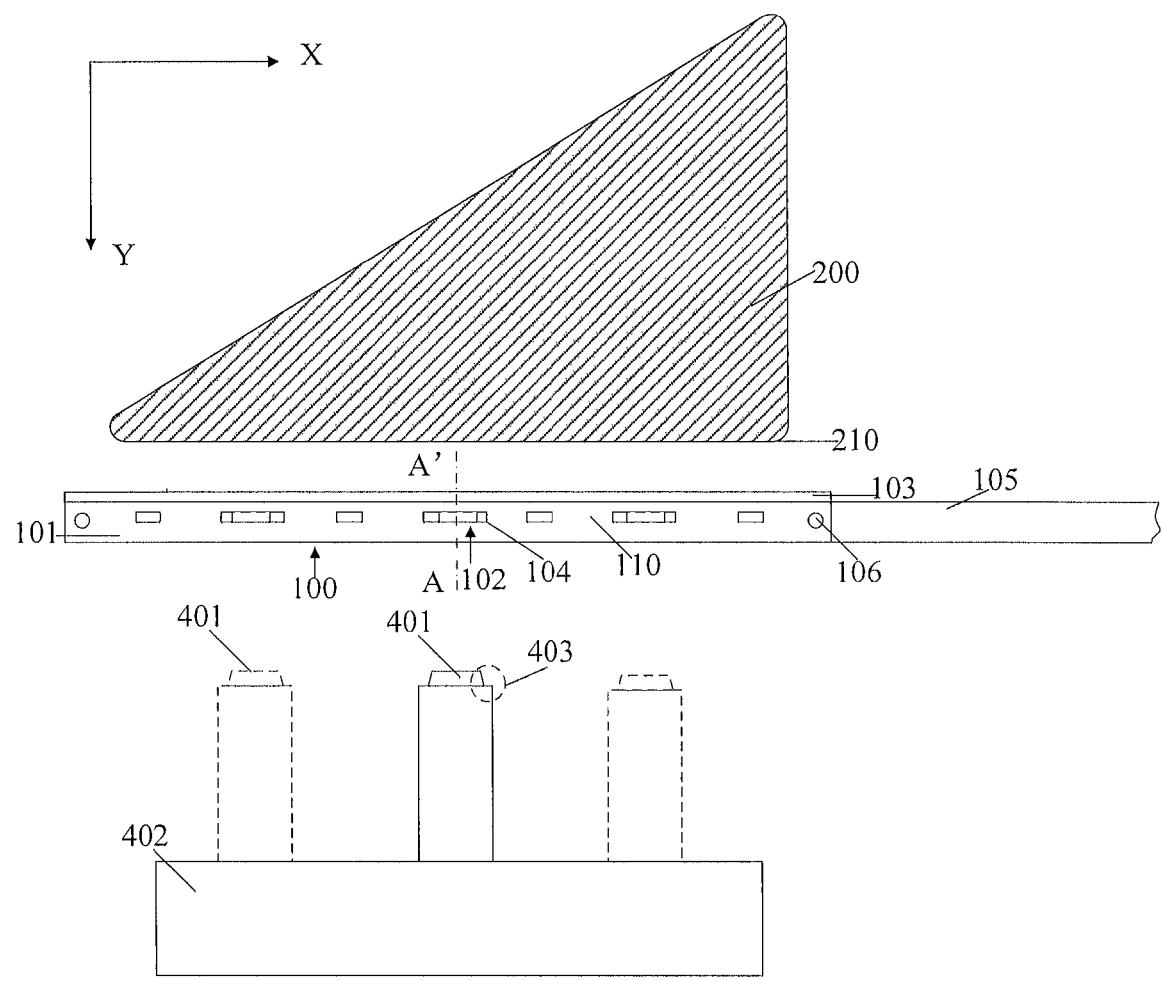
FIG. 3 schematically illustrates a diagram of an injection molding device according to an embodiment of the present disclosure.
Figure 4:
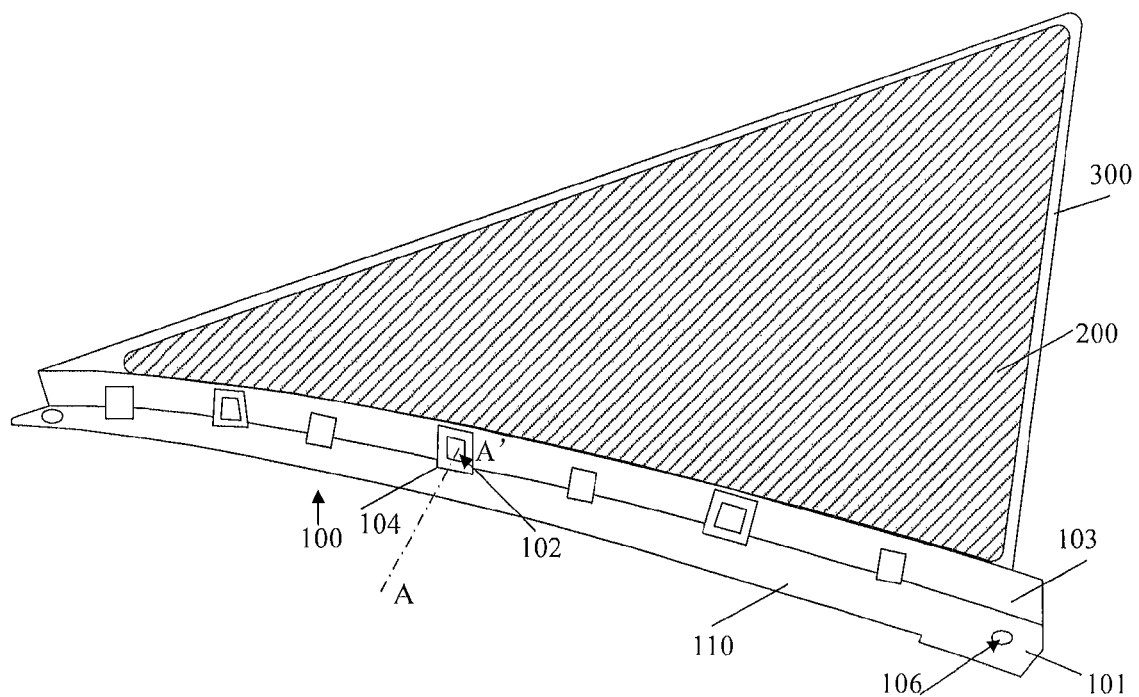
FIG. 4 schematically illustrates a diagram of a glass encapsulation structure according to an embodiment of the present disclosure.

In embodiments of the present disclosure, injection molding devices are provided. FIG. 3 schematically illustrates a diagram of an injection molding device, and FIG. 4 schematically illustrates a diagram of a glass encapsulation structure formed by the injection molding device, according to an embodiment of the present disclosure. Referring to FIGS. 3 and 4, the injection molding device is adapted for forming an encapsulation component 300 for a fixed glass 200 and a guide piece 100.

In some embodiments, the glass 200 is triangular, and the injection molding device is adapted for forming the encapsulation component 300 at edges of the triangular glass 200. It should be noted that, the present disclosure is not limited thereto.

Referring to FIGS. 3 and 4, the guide piece 100 includes a strip part 101, the strip part 101 has a first surface 110, and a second surface which is opposite to the first surface 110 and faces an interior of a vehicle body when the guide piece is mounted onto the vehicle body. The guide piece 100 further includes a plurality of bumps 104 located on the first surface 110 and perpendicular to the first surface 110. The guide piece 100 further includes at least one positioning hole 102 formed in the bumps 104. An axis AA' of the at least one positioning hole 102 is perpendicular to a side surface 210 of the glass 200. Referring to FIGS. 3 and 4, the side surface 210 is located in a plane defined by X and Z axes, and the axis AA' extends along a Y-axis direction.

The injection molding device includes at least one positioning pin 401, which is adapted for matching the at least one positioning hole 102 in an injection molding process, such that a position relationship between the guide piece 100 and the glass 200 retains unchanged in the injection molding process. Therefore, even the guide piece 100 is impacted by a molten plastic in the injection molding process, the guide piece 100 may not be deformed or displaced as it is fixed by the positioning pin 401, and the encapsulation component 300 may cover the guide piece 100 in an expected manner where the shape and position of the encapsulated component are predetermined. In this way, the possibility of the guide piece 100 being exposed is lowered, and thus a yield of encapsulation structures may be improved.

Referring to FIGS. 3 and 4, the guide piece 100 further includes a sealing part 103 having a shape of strip and perpendicular to the first surface 110 of the guide piece 100. The sealing part 103 is adjacent to the side surface 210 of the glass 200, and extends flush with or beyond a surface of the glass 200 (i.e. the surface visible in FIGS. 3 and 4). A cavity of the injection molding device is configured in this way. When the guide piece 100 and the glass 200 are disposed in the cavity, a top surface of the sealing part 103 in a plane defined by the X and Y axes (i.e., a surface of the sealing part 103 which faces the interior of the vehicle when the glass is mounted onto the vehicle body) should press against an inner wall of the cavity, such that the encapsulation component 300 formed can cover the side surface 210 of the glass 200, the sealing part 103, and the second surface of the strip part 101 of the guide piece 100. In this way, the position relationship between the guide piece 100 and the glass 200 can retain unchanged.

Due to the sealing part 103, in the injection molding process, the molten plastic can be blocked by the sealing part 103, and thus may not flow to the strip part 101 and the bumps 104. Therefore, when an injection molding mould is removed, the strip part 101 and the bumps 104 are not covered by the encapsulation component 300. In some embodiments, the bumps 104 are adapted for mounting the guide piece 100 onto the vehicle body. Referring to FIG. 3, the guide piece 100 further includes a slide way 105. When the guide piece 100 and the glass 200 are mounted on the vehicle body, the slide way 105 may be adapted for accommodating a guide strip. In some embodiments, the guide strip may be a guide strip of a side window beside the glass 200, such that the side window can move up and down.

It should be understood that the sealing part 103 is not necessary. In some embodiments, the injection molding device includes a slide block. During an injection molding process, the slide block prevents the molten plastic from flowing to the strip part 101 and the bumps 104.

Referring to FIGS. 3 and 4, there are a plurality of positioning holes 102 evenly distributed along a length direction of the strip part 101. In some embodiments, there is one positioning pin 401. During an injection molding process, the positioning pin 401 is fixed into the positioning hole 102 which is located in the middle of the strip part 101, to reduce deformation or displacement of the strip part 101.

In some embodiments, there are a plurality of positioning pins 401. During an injection molding process, the positioning pins 401 are fixed into the positioning holes 102 respectively, to make the strip part 101 withstand force evenly.

In some embodiments, the bumps 104 are square, and the at least one positioning hole 102 is square. Each of the at least one square positioning hole 102 may be disposed in the center of one square bump 104, to ensure distances between the positioning hole 102 and each side of the square bump 104 to be almost the same and ensure the bump 104 having the positioning hole 102 to have same capacity of withstanding pressure in various directions.

In some embodiments, the positioning pin 401 includes: a first terminal adapted for being inserted into the positioning hole 102 in an injection molding process; and a second terminal adapted for being fixed in an injection molding mould. The positioning pin 401 has a shape of wedge whose size increases gradually from the first terminal to the second terminal. The first terminal has a size smaller than a size of the positioning hole 102, and the second terminal has a size greater than the size of the positioning hole 102. Thus, after the positioning pin 401 is inserted into the positioning hole 102, they are fastened to each other, that is, an interference fit is formed therebetween. For example, the bump 104 has a height of 5 mm and a width of 5 mm, and the positioning hole 102 is a square each side of which has a length of 4.8 mm. A cross section of the first terminal of the positioning pin 401 is a square each side of which has a length of 4.5 mm, and a cross section of the second terminal of the positioning pin 401 is a square each side of which has a length of 5 mm. Therefore, an interference fit is formed between the positioning pin 401 and the positioning hole 102.

It should be noted that, shape of the at least one positioning hole 102 has been described in the embodiments. However, the present disclosure is not limited thereto. In some embodiments, the positioning hole 102 may be circular. In some embodiments, the positioning pin 401 includes: a first terminal adapted for being inserted into the positioning hole 102 during an injection molding process; and a second terminal adapted for being fixed in an injection molding mould. The positioning pin 401 has a shape of cone whose size increases gradually from the first terminal to the second terminal. The first terminal has a size smaller than a size of the positioning hole 102, and the second terminal has a size greater than the size of the positioning hole 102. Thus, after the positioning pin 401 is inserted into the positioning hole 102, they are fastened to each other, that is, an interference fit is formed therebetween. For example, the bump 104 has a height of 5 mm and a width of 5 mm, and the positioning hole 102 is a circle hole having a diameter of 4.8 mm. A cross section of the first terminal of the positioning pin 401 is a circle having a diameter of 4.5 mm, and a cross section of the second terminal of the positioning pin 401 is a circle having a diameter of 5 mm. Therefore, an interference fit is formed between the positioning pin 401 and the positioning hole 102.

The interference fit between the positioning pin 401 and the positioning hole 102 is described above. It should be noted that, in some embodiments, an interference fit may not be necessary. In some embodiments, the positioning pin 401 includes a first terminal adapted for being inserted into the positioning hole 102 during an injection molding process; and a second terminal adapted for being fixed in an injection molding mould. The first terminal has a step 403. After the first terminal is inserted into the positioning hole 102, the step 403 presses against an edge of the positioning hole 102, to prevent deformation and displacement of the guide piece 100 along the Y-axis direction.

Referring to FIG. 3, the injection molding device may further include: a slide block 402 formed on the second terminal of the positioning pin 401 and adapted for fixing the positioning pin 401 in the injection molding mould; and a pressure driver (not shown in Figures) connected with the slide block 402 and adapted for driving the slide block 402 to lead the positioning pin 401 to move along the axis AA' of the positioning hole 102, such that the positioning pin 401 can be fixed into the positioning hole 102 to realize the fixing of the guide piece 100. In some embodiments, a slide rail may be formed along the axis AA' in the injection molding mould to accommodate the slide block 402, such that the positioning pin 401 can move along the axis AA'. In some embodiments, the pressure driver may be oil pressure driven or gas driven. It should be noted that, although the fixing mode and the driving mode of the positioning pin 401 in the injection molding mould are described in the embodiments, the present disclosure is not limited thereto.

Accordingly, in embodiments of the present disclosure, glass encapsulation structures are provided. FIG. 3 schematically illustrates a diagram of an injection molding device for forming a glass encapsulation structure, and FIG. 4 schematically illustrates a diagram of the glass encapsulation structure, according to an embodiment of the present disclosure. Referring to FIGS. 3 and 4, the glass encapsulation structure includes: a guide piece 100; and an encapsulation component 300 for fixing a glass 200 with the guide piece 100. The encapsulation component 300 may be formed by an injection molding process using an injection molding device. In some embodiments, at least one positioning pin 401 is formed in the injection molding device.

The guide piece 100 includes a strip part 101, a plurality of bumps 104 and at least one positioning hole 102. The strip part 101 has a first surface 110, and a second surface which is opposite to the first surface 110 and faces an interior of a vehicle body when the guide piece is mounted onto the vehicle body. The plurality of bumps 104 are located on the first surface 110 and perpendicular to the first surface 110. The at least one positioning hole 102 is formed in at least one of the bumps 104. An axis AA' of the at least one positioning hole 102 is perpendicular to a side surface 210 of the glass 200 (the connection between the guide piece 100 and the glass 200 is realized by fixing the guide piece 100 to the side surface 210 of the glass 200 through the encapsulation component 300). In an injection molding process, the at least one positioning hole 102 matches the at least one positioning pin 401, such that the guide piece 100 may not be deformed or displaced, a position relationship between the guide piece 100 and the glass 200 retains unchanged in the injection molding process, and the encapsulation component 300 may cover the guide piece 100 in an expected manner where the shape and position of the encapsulated component are predetermined. In this way, the possibility of the guide piece 100 being exposed is lowered, and thus a yield of encapsulation structures may be improved.

Referring to FIGS. 3 and 4, the guide piece 100 further includes a sealing part 103 having a shape of strip and perpendicular to the first surface 110 of the guide piece 100. The encapsulation component 300 is formed at edges of the glass 200 and covers the sealing part 103. The sealing part 103 is adjacent to the side surface 210 of the glass 200, and extends flush with or beyond a surface of the glass 200 (i.e. the surface visible in FIGS. 3 and 4). A cavity of the injection molding device is configured in this way. When the guide piece 100 and the glass 200 are disposed in the cavity, a top surface of the sealing part 103 in a plane defined by the X and Y axes (i.e., a surface of the sealing part 103 which faces the interior of the vehicle body when the glass is mounted onto the vehicle body) should press against an inner wall of the cavity, such that the encapsulation component 300 formed can cover the side surface 210 of the glass 200, the sealing part 103, and the second surface of the strip part 101 of the guide piece 100. In this way, the position relationship between the guide piece 100 and the glass 200 retains unchanged.

Due to the sealing part 103, in the injection molding process, a molten plastic can be blocked by the sealing part 103, and thus may not flow to the strip part 101 and the bumps 104. Therefore, when an injection molding mould is removed, the strip part 101 and the bumps 104 are not covered by the encapsulation component 300. In some embodiments, the bumps 104 are adapted for mounting the guide piece 100 onto a vehicle body. Referring to FIG. 3, the guide piece 100 further includes a slide way 105. When the guide piece 100 and the glass 200 are mounted on the vehicle body, the slide way 105 may accommodate a guide strip. In some embodiments, the guide strip may be a guide strip of a side window beside the glass 200, such that the side window can move up and down.

It should be understood that the sealing part 103 is not necessary. In some embodiments, the injection molding device includes a slide block. During an injection molding process, the slide block prevents the molten plastic from flowing to the strip part 101 and the bumps 104.

As the strip part 101 has a shape of strip and two terminals of the strip part 101 are fixed (for example, through holes 106 in the strip part 101) in the injection molding process, a middle portion of the strip part 101 may be deformed or displaced.

In some embodiments, there is one positioning hole 102 disposed in the middle of the strip part 101. During an injection molding process, the positioning pin 401 is fixed into the positioning hole 102 in the middle of the strip part 101, to reduce deformation or displacement of the strip part 101.

In some embodiments, there are a plurality of positioning holes 102 evenly distributed along a length direction of the strip part 101. In some embodiments, there is one positioning pin 401, and the positioning pin 401 may be fixed into the positioning hole 102 in the middle of the strip part 101 during an injection molding process, to reduce deformation or displacement of the strip part 101. In some embodiments, there are a plurality of positioning pins 401, and the positioning pins 401 are fixed into the positioning holes 102 respectively along a length direction of the strip part 101 during an injection molding process, to make the strip part 101 withstand force evenly and further reduce deformation or displacement of the strip part 101

Referring to FIGS. 3 and 4, the plurality of bumps 104 are located on the first surface 110 of the strip part 101 and perpendicular to the first surface 110. The at least one positioning hole 102 as through hole are formed in the bumps 104. During an injection molding process, the at least one positioning pin 401 can be inserted into the bumps 104 to be fixed with the bumps 104. After the insertion, an interference fit may be formed between the positioning pin 401 and the positioning hole 102.

In some embodiments, the bumps 104 are square, and the at least one positioning hole 102 is square. Each of the at least one square positioning hole 102 may be disposed in the center of one square bump 104, to ensure distances between the positioning hole 102 and each side of the square bump 104 to be almost the same and ensure the bump 104 having the positioning hole 102 to have same capacity of withstanding pressure in various directions. In some embodiments, the positioning pin 401 includes: a first terminal adapted for being inserted into the positioning hole 102 in an injection molding process; and a second terminal adapted for being fixed in an injection molding mould. The positioning pin 401 has a shape of wedge whose size increases gradually from the first terminal to the second terminal. The first terminal has a size smaller than a size of the positioning hole 102, and the second terminal has a size greater than the size of the positioning hole 102. Thus, after the positioning pin 401 is inserted into the positioning hole 102, they are fastened to each other, that is, an interference fit is formed therebetween. For example, the bump 104 has a height of 5 mm and a width of 5 mm, and the positioning hole 102 is a square each side of which has a length of 4.8 mm. A cross section of the first terminal of the positioning pin 401 is a square each side of which has a length of 4.5 mm, and a cross section of the second terminal of the positioning pin 401 is a square each side of which has a length of 5 mm. Therefore, an interference fit is formed between the positioning pin 401 and the positioning hole 102.

It should be noted that, shape of the at least one positioning hole 102 has been described in the embodiments. However, the present disclosure is not limited thereto. In some embodiments, the positioning hole 102 may be circular. In some embodiments, the positioning pin 401 includes: a first terminal adapted for being inserted into the positioning hole 102 during an injection molding process; and a second terminal adapted for being fixed in an injection molding mould. The positioning pin 401 has a shape of cone whose size increases gradually from the first terminal to the second terminal. The first terminal has a size smaller than a size of the positioning hole 102, and the second terminal has a size greater than the size of the positioning hole 102. Thus, after the positioning pin 401 is inserted into the positioning hole 102, they are fastened to each other, that is, an interference fit is formed therebetween. For example, the bump 104 has a height of 5 mm and a width of 5 mm, and the positioning hole 102 is a circle hole having a diameter of 4.8 mm. A cross section of the first terminal of the positioning pin 401 is a circle having a diameter of 4.5 mm, and a cross section of the second terminal of the positioning pin 401 is a circle having a diameter of 5 mm. Therefore, an interference fit is formed between the positioning pin 401 and the positioning hole 102.

The interference fit between the positioning pin 401 and the positioning hole 102 is described above. It should be noted that, in some embodiments, an interference fit may not be necessary. In some embodiments, the positioning pin 401 includes a first terminal adapted for being inserted into the positioning hole 102 during an injection molding process; and a second terminal adapted for being fixed in an injection molding mould. The first terminal has a step 403. After the first terminal is inserted into the positioning hole 102, the step 403 presses against an edge of the positioning hole 102, to prevent deformation and displacement of the guide piece 100 along the Y-axis direction.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure. Therefore, the protection scope of the present disclosure is subject to the scope defined by the claims.

What is claimed is:

1. A glass encapsulation structure, comprising:
a guide piece; and
an encapsulation component,
wherein the guide piece is fixed to a side surface of a glass through the encapsulation component,
wherein the guide piece comprises a strip part, a plurality of bumps and at least one positioning hole, and
wherein the strip part has a first surface, and a second surface which is opposite to the first surface and faces an interior of a vehicle body when the guide piece is mounted onto the vehicle body, the plurality of bumps are located on the first surface and perpendicular to the first surface, the at least one positioning hole is formed in at least one of the bumps, an axis of the at least one positioning hole is perpendicular to the side surface of the glass, and the at least one positioning hole is adapted for matching at least one positioning pin in an injection molding device in an injection molding process, such that a position relationship between the guide piece and the glass retains unchanged in the injection molding process.

2. The glass encapsulation structure according to claim 1, wherein the guide piece further comprises a sealing part perpendicular to the first surface of the strip part, wherein the sealing part is adjacent to the side surface of the glass, and extends flush with or beyond a surface of the glass.

3. The glass encapsulation structure according to claim 2, wherein the encapsulation component covers the side surface of the glass, the sealing part, and the second surface of the strip part.

4. The glass encapsulation structure according to claim 1, wherein the plurality of bumps are adapted for mounting the guide piece onto the vehicle body.

5. The glass encapsulation structure according to claim 1, wherein the at least one positioning hole comprises one positioning hole disposed in one bump in the middle of the strip part, or the at least one positioning hole comprises a plurality of positioning holes disposed in the plurality of bumps, respectively.

6. The glass encapsulation structure according to claim 1, wherein the at least one positioning hole is circular, and each positioning pin comprises:
a first terminal adapted for being inserted into one positioning hole during an injection molding process; and
a second terminal adapted for being fixed in an injection molding mould,
wherein the positioning pin has a shape of cone whose size increases gradually from the first terminal to the second terminal, the first terminal has a size smaller than a size of the positioning hole, and the second terminal has a size greater than the size of the positioning hole, and wherein after the at least one positioning pin is inserted into the at least one positioning hole, an interference fit is formed therebetween.

7. The glass encapsulation structure according to claim 1, wherein the at least one positioning hole is square, and each positioning pin comprises:

a first terminal adapted for being inserted into one positioning hole during an injection molding process; and a second terminal adapted for being fixed in an injection molding mould, wherein the positioning pin has a shape of wedge whose size increases gradually from the first terminal to the second terminal, the first terminal has a size smaller than a size of the positioning hole, and the second terminal has a size greater than the size of the positioning hole, and wherein after the at least one positioning pin is inserted into the at least one positioning hole, an interference fit is formed therebetween.

8. The glass encapsulation structure according to claim 1, wherein each positioning pin comprises:

a first terminal which has a step and is adapted for being inserted into one positioning hole during an injection molding process; and a second terminal adapted for being fixed in an injection molding mould, wherein after the first terminal is inserted into the positioning hole, the step presses against an edge of the positioning hole.

\* \* \* \* \*